United States Patent
Cheng

(10) Patent No.: US 9,008,931 B2
(45) Date of Patent: Apr. 14, 2015

(54) BICYCLE GEAR SHIFT CONTROL SYSTEM CAPABLE OF AVOIDING FREQUENT GEAR SHIFTING

(75) Inventor: Chi-Chang Cheng, New Taipei (TW)

(73) Assignee: J.D. Components Co., Ltd., Chang Hua Hsien (TW)

( * ) Notice: Subject to any disclaimer, the term of this patent is extended or adjusted under 35 U.S.C. 154(b) by 150 days.

(21) Appl. No.: 13/542,568

(22) Filed: Jul. 5, 2012

(65) Prior Publication Data

US 2013/0096783 A1      Apr. 18, 2013

(30) Foreign Application Priority Data

Oct. 18, 2011   (TW) .............................. 100137797 A

(51) Int. Cl.
| | |
|---|---|
| *B62M 25/08* | (2006.01) |
| *F16H 59/68* | (2006.01) |
| *F16H 61/02* | (2006.01) |
| *F16H 59/00* | (2006.01) |
| *F16H 61/16* | (2006.01) |

(52) U.S. Cl.
CPC ............ *B62M 25/08* (2013.01); *F16H 61/0213* (2013.01); *F16H 59/68* (2013.01); *F16H 2059/006* (2013.01); *F16H 2061/163* (2013.01)

(58) Field of Classification Search
USPC ............................... 701/51, 52, 55, 56, 62, 66
See application file for complete search history.

(56) References Cited

U.S. PATENT DOCUMENTS

| | | | | |
|---|---|---|---|---|
| 4,850,939 | A * | 7/1989 | Chilcote et al. ................. | 474/49 |
| 5,213,548 | A * | 5/1993 | Colbert et al. .................. | 474/71 |
| 5,261,858 | A * | 11/1993 | Browning ........................ | 474/69 |
| 5,681,234 | A * | 10/1997 | Ethington ........................ | 474/70 |
| 6,835,148 | B2 * | 12/2004 | Takebayashi et al. ........... | 474/70 |
| 6,837,505 | B2 * | 1/2005 | Fujii ............................. | 280/260 |
| 6,884,190 | B2 * | 4/2005 | Takebayashi .................... | 474/78 |
| 7,290,779 | B2 * | 11/2007 | Takamoto et al. ............. | 280/260 |
| 7,399,244 | B2 * | 7/2008 | Takebayashi et al. ........... | 474/70 |
| 8,874,338 | B2 * | 10/2014 | Miglioranza ................... | 701/66 |
| 2005/0227798 | A1 * | 10/2005 | Ichida et al. .................... | 474/81 |
| 2008/0312799 | A1 * | 12/2008 | Miglioranza ................... | 701/66 |

* cited by examiner

*Primary Examiner* — Tuan C. To
*Assistant Examiner* — Dale W Hilgendorf
(74) *Attorney, Agent, or Firm* — Muncy, Geissler, Olds & Lowe, P.C.

(57) ABSTRACT

A bicycle gear shift control system capable of avoiding frequent gear shifting includes: a power module; a microcomputer electrically connected to the power module for allowing a cyclist to switch between the automatic gear shifting mode and a manual gear shifting mode; a gear shifting driver electrically connected to the microcomputer, substantially connected to a derailleur, and instructed by the microcomputer to drive the derailleur to perform gear shift control; and a manual shifting controller electrically connected to the microcomputer. The microcomputer has an automatic gear shifting logic whereby the microcomputer determines the timing of automatic gear shifting and performs gear shifting. The microcomputer further has a gear shifting delay logic that involves delaying for a delay time interval from commencement of gear shifting according to a gear shifting criterion and ruling out all other gear shifting commands during the delay time interval.

4 Claims, 5 Drawing Sheets

BICYCLE GEAR SHIFT CONTROL SYSTEM CAPABLE OF AVOIDING FREQUENT GEAR SHIFTING

BACKGROUND OF THE INVENTION

1. Field of the Invention

The present invention relates to bicycle gear shift control systems, and more particularly, to a bicycle gear shift control system capable of avoiding frequent gear shifting.

2. Description of Related Art

A conventional bicycle capable of performing automatic gear shift control typically comprises a microcomputer configured with a gear shifting logic, such that the microcomputer controls a corresponding derailleur to perform gear shifting whenever a gear shift control criterion of the gear shifting logic is met, for example, when the speed of the conventional bicycle reaches a predetermined speed. The cyclist who is pedaling the conventional bicycle perceives a change in a pedaling frequency and a pedaling load because the gear shifting action has changed the gear ratio.

However, cycling never takes place in an invariable environment. For example, cyclists not only stop for a red traffic light, but make different abrupt changes to the cycling speed in order to ride up or ride down a ramp. Still, the microcomputer responds to any large abrupt change in cycling speed by performing automatic gear shift control in accordance with its gear shifting logic. As a result, frequent gear shifting poses an issue. If completion of gear shift control is always immediately followed by detection that a gear shift control criterion has just been met, gear shift control will have to be performed repeatedly. The cyclists perceive persistent variation of a pedaling frequency and a pedaling load and thus feel uncomfortable and frustrated. Also, if a gear-up operation is immediately followed by a gear-down operation due to a change in cycling speed, the cyclists will perceive reciprocating gear shift movement despite the unchanged cycling speed; as a result, the cyclists perceive persistent variation of a pedaling frequency and a pedaling load and thus feel uncomfortable and frustrated.

Sometimes a cyclist prefers manual gear shifting over ongoing automatic gear shift control while cycling. To meet the aforesaid need, the prior art allows the cyclist to switch the microcomputer between an automatic gear shifting mode and a manual gear shifting mode. In the manual gear shifting mode, the cyclist performs gear shifting manually. In the automatic gear shifting mode, it is the microcomputer rather than the cyclist that determines and operates gear shifting.

Nonetheless, the aforesaid prior art has a drawback. Sometimes a cyclist wants to downshift manually for just a short period of time in the automatic gear shifting mode in order to ride up a short ramp or attempt quick overtaking, for example. To this end, the cyclist has to switch to the manual gear shifting mode before down shifting, because it is impossible to perform gear shifting in automatic gear shifting mode. However, it is inconvenient for the cyclist to do so.

SUMMARY OF THE INVENTION

It is an objective of the present invention to provide a bicycle gear shift control system capable of avoiding frequent gear shifting, such that cycling is made comfortable by avoiding frequent gear shifting.

Another objective of the present invention is to provide a bicycle gear shift control system capable of avoiding frequent gear shifting, so as for cycling to be rendered comfortable by avoiding reciprocating gear shift movement which alternates between an upshift and a downshift.

Yet another objective of the present invention is to provide a bicycle gear shift control system capable of avoiding frequent gear shifting such that, in an automatic gear shifting mode, a cyclist can switch to a manual gear shifting mode for a period of time temporarily in order to perform manual gear shifting before switching back to the automatic gear shifting mode.

In order to achieve the above and other objectives, the present invention provides a bicycle gear shift control system capable of avoiding frequent gear shifting. The system is installed on a bicycle having a derailleur and adapted to control a gear shifting action of the derailleur. The bicycle gear shift control system capable of avoiding frequent gear shifting comprises: a power module; a microcomputer electrically connected to the power module and adapted to enable a cyclist to switch between an automatic gear shifting mode and a manual gear shifting mode; a gear shifting driver electrically connected to the microcomputer, substantially connected to the derailleur, and instructed by the microcomputer to drive the derailleur to perform gear shift control; and a manual shifting controller electrically connected to the microcomputer; characterized in that: the microcomputer has an automatic gear shifting logic whereby the microcomputer determines a timing of automatic gear shifting and performs gear shifting; the microcomputer further has a gear shifting delay logic, wherein the gear shifting delay logic involves delaying for a delay time interval from commencement of gear shifting according to a gear shifting criterion, and ruling out all other gear shifting commands during the delay time interval.

BRIEF DESCRIPTION OF THE SEVERAL VIEWS OF THE DRAWINGS

Objectives, features, and advantages of the present invention are hereunder illustrated with specific embodiments in conjunction with the accompanying drawings, in which.

DETAILED DESCRIPTION OF THE EMBODIMENTS OF THE INVENTION

Figure 1:
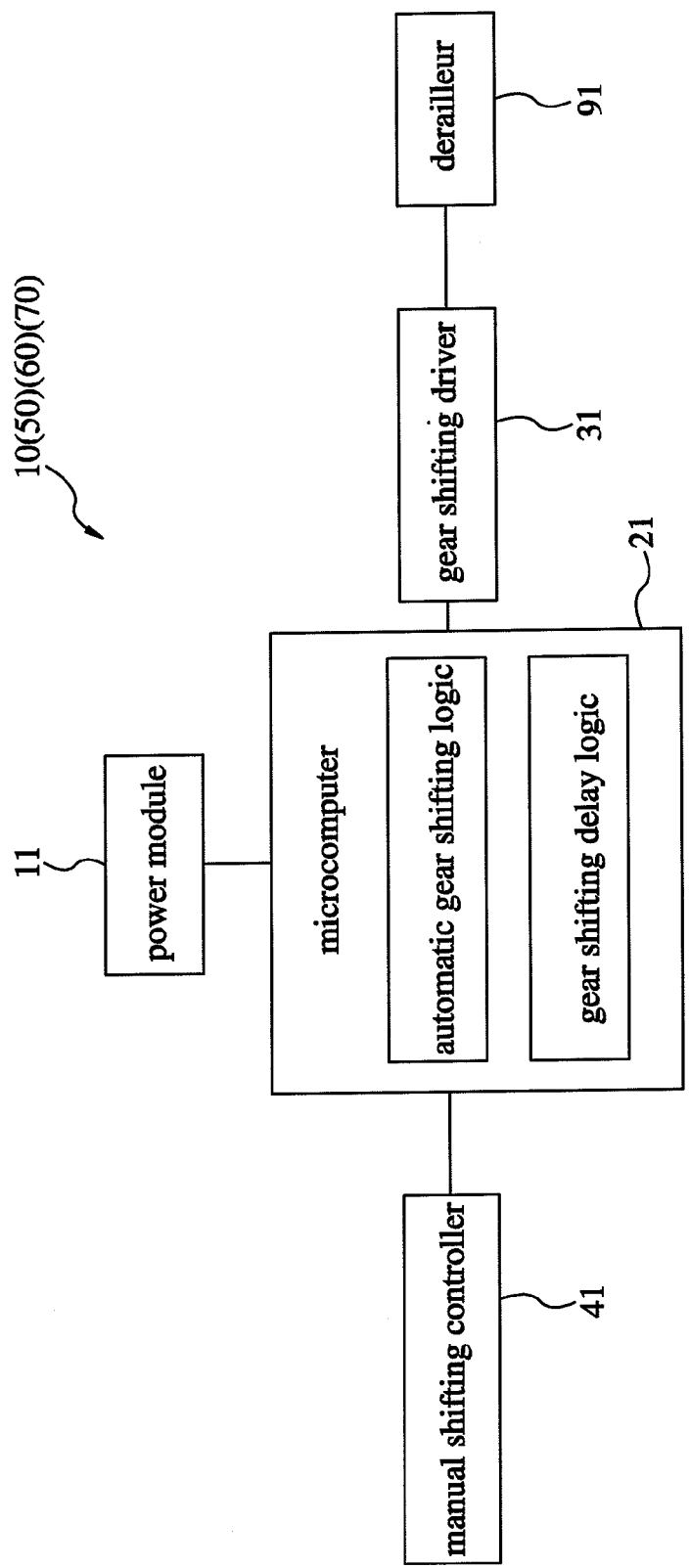
FIG. 1 is a schematic view of the structure of the first preferred embodiment of the present invention.
Figure 2:
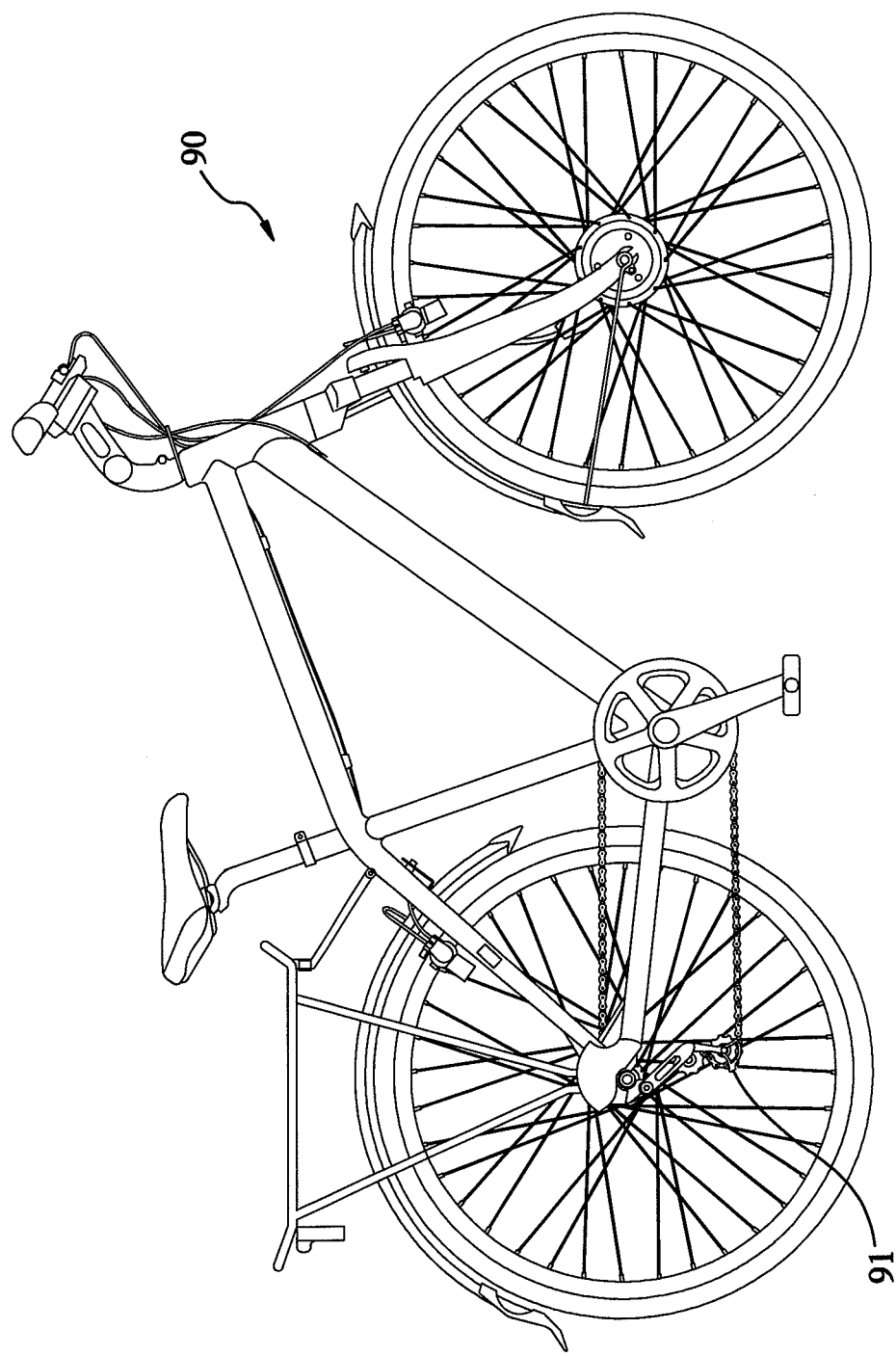
FIG. 2 is a schematic view of the installation of the first preferred embodiment of the present invention.
Figure 3:
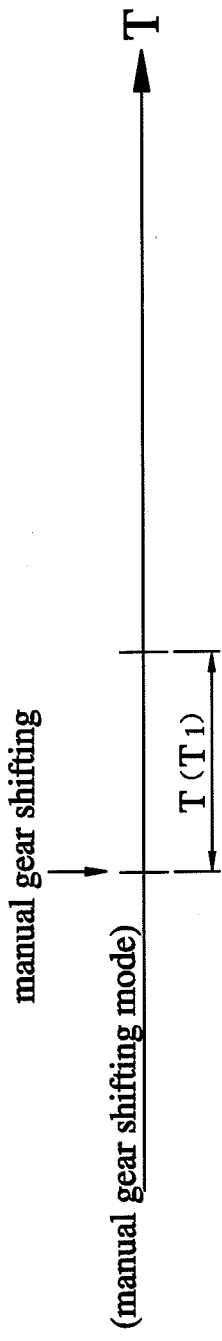
FIG. 3 is a schematic view of the relationship of a gear shifting action and time according to the first preferred embodiment of the present invention.

Referring to FIG. 1 through FIG. 3, a bicycle gear shift control system 10 capable of avoiding frequent gear shifting according to the first preferred embodiment of the present invention is installed on a bicycle 90 having a derailleur 91 and adapted to control a gear shifting action of the derailleur 91. The bicycle gear shift control system 10 capable of avoiding frequent gear shifting essentially comprises a power module 11, a microcomputer 21, a gear shifting driver 31, and a manual shifting controller 41.

The power module 11 supplies power.

The microcomputer 21 is electrically connected to the power module 11. The microcomputer 21 enables a cyclist to switch between an automatic gear shifting mode and a manual gear shifting mode.

The gear shifting driver 31 is electrically connected to the microcomputer 21, substantially connected to the derailleur 91, and instructed by the microcomputer 21 to drive the derailleur 91 to perform gear shift control.

The manual shifting controller 41 is electrically connected to the microcomputer 21. The cyclist performs gear shift control manually by means of the manual shifting controller 41.

The technical features of this embodiment are described below.

The microcomputer 21 has an automatic gear shifting logic whereby the microcomputer 21 determines the timing of automatic gear shifting and performs gear shifting.

The microcomputer 21 further has a gear shifting delay logic. The gear shifting delay logic involves delaying for a delay time interval T upon occurrence of gear shifting according to a gear shifting criterion and ruling out all other gear shifting commands during the delay time interval T. In the first embodiment, the gear shifting criterion is: in the manual gear shifting mode, the cyclist executes an instruction of manual gear shifting with the manual shifting controller 41. The delay time interval T is a first time period T1, and it lasts 0.4 second (but is not limited thereto) in the first embodiment.

If the cyclist switches to the automatic gear shifting mode, the microcomputer 21 will rule out any gear shifting command issued by the cyclist with the manual shifting controller 41. That is to say, in the first embodiment, manual gear shifting cannot be carried out with the manual shifting controller 41 in the automatic gear shifting mode. It is necessary to switch the microcomputer 21 to the manual gear shifting mode in order for manual gear shifting to occur.

Referring to FIG. 3, in the first embodiment, after the cyclist has switched the microcomputer 21 to the manual gear shifting mode, if the cyclist executes an instruction of manual gear shifting with the manual shifting controller 41 while cycling, the microcomputer 21 will take an action of gear shifting in accordance with the instruction of the manual gear shifting to cause the gear shifting driver 31 to drive the derailleur 91 to perform gear shifting. The microcomputer 21 will rule out all other gear shifting commands during the first time period T1 (of 0.4 second). Hence, during the first time period T1, even if the cyclist issues an instruction of gear shifting with the manual shifting controller 41 right away, the microcomputer 21 will rule out the instruction of gear shifting. In doing so, the bicycle gear shift control system of the present invention avoids frequent gear shifting by precluding the possibility that gear shifting keep occurring at short intervals.

Figure 4:
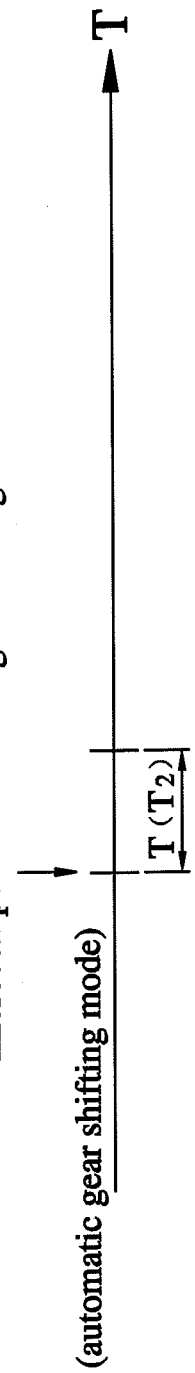
FIG. 4 is a schematic view of the relationship of a gear shifting action and time according to the second preferred embodiment

Referring to FIG. 4, a bicycle gear shift control system 50 capable of avoiding frequent gear shifting according to the second preferred embodiment of the present invention is different from the bicycle gear shift control system 10 in the first preferred embodiment of the present invention as described hereunder.

The gear shifting criterion is: in the automatic gear shifting mode, the microcomputer 21 determines to perform gear shifting and issues a gear shifting control signal for controlling gear shifting through the gear shifting driver 31. The delay time interval T is a second time period T2. The second time period T2 is the time taken for the gear shifting performed by the derailleur 91 driven by the gear shifting driver 31 under the control of the microcomputer 21. In the second embodiment, the second time period T2 is exemplified by 0.2 second.

Referring to FIG. 4, in the second embodiment, after the cyclist has switched the microcomputer 21 to the automatic gear shifting mode, if the microcomputer 21 determines to perform gear shifting according to the automatic gear shifting logic while cycling is underway, the microcomputer 21 will instruct the gear shifting driver 31 to drive the derailleur 91 to perform gear shifting. The microcomputer 21 will rule out all other gear shifting commands during the second time period T2 (of 0.2 second). Hence, during the second time period T2, even if the microcomputer 21 determines to perform gear shifting according to the automatic gear shifting logic again, the microcomputer 21 will rule out the determination and thus prevent gear shifting from occurring. In doing so, the bicycle gear shift control system of the present invention avoids frequent gear shifting by precluding the possibility that gear shifting keep occurring at short intervals.

The remaining structures and advantages of the second embodiment are identical to their counterparts of the first embodiment and thus are not reiterated for the sake of brevity.

Figure 5:
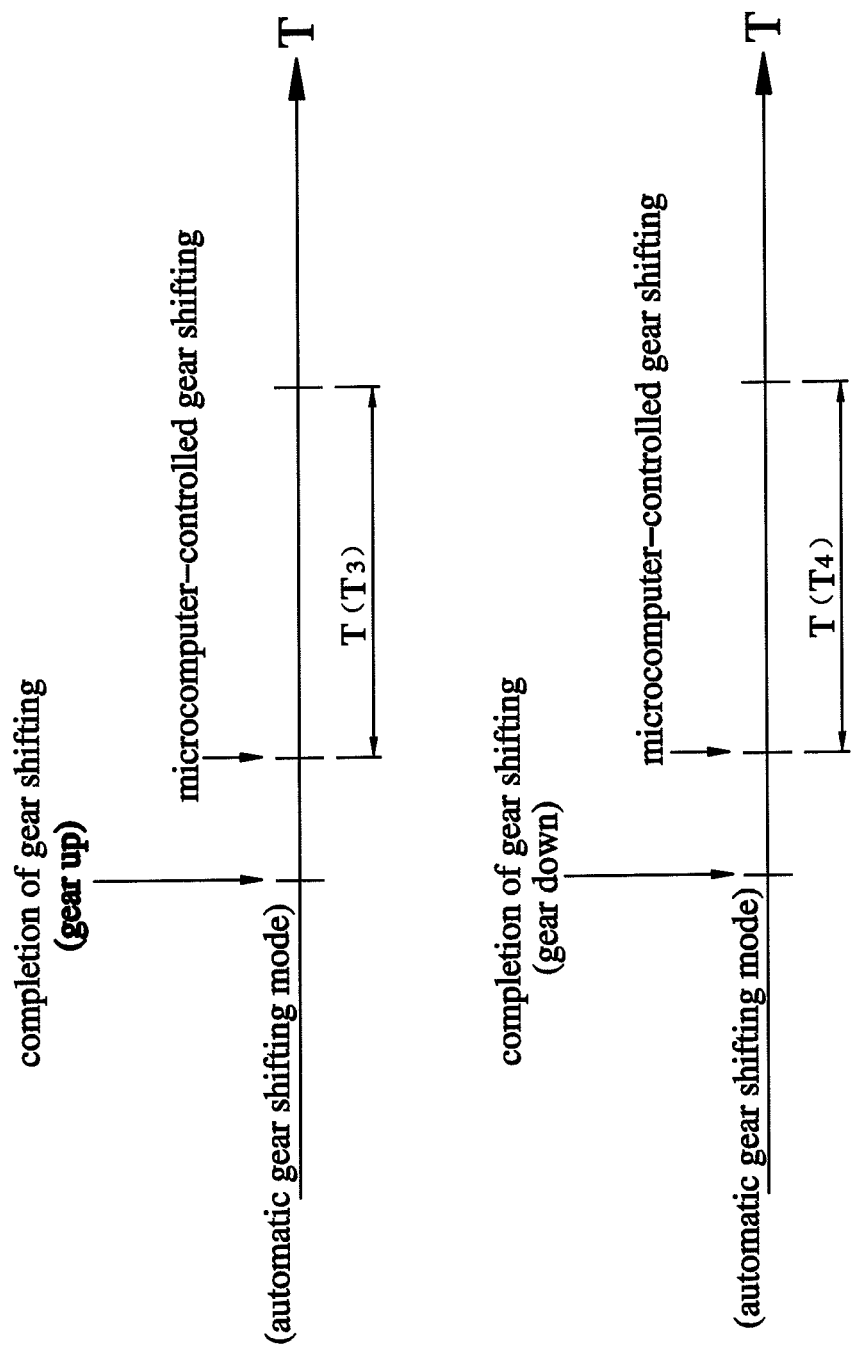
FIG. 5 is a schematic view of the relationship of a gear shifting action and time according to the third preferred embodiment of the present invention.

Referring to FIG. 5, a bicycle gear shift control system 60 capable of avoiding frequent gear shifting according to the third preferred embodiment of the present invention is different from the bicycle gear shift control system 10 in the first preferred embodiment of the present invention as described hereunder.

The gear shifting criteria are: (1) in the automatic gear shifting mode, after the microcomputer 21 has instructed the gear shifting driver 31 to drive the derailleur 91 to perform gear-up gear shifting action, the microcomputer 21 does not rule out all other gear shifting commands but merely rules out gear-down gear shifting commands, wherein the delay time interval T is a third time period T3; and (2) in the automatic gear shifting mode, after the microcomputer 21 has instructed the gear shifting driver 31 to drive the derailleur 91 to perform gear-down gear shifting action, the microcomputer 21 does not rule out all other gear shifting commands but merely rules out gear-up gear shifting commands, wherein the delay time interval T is a fourth time period T4.

In the third embodiment, both the third time period T3 and the fourth time period T4 are 1.5 seconds.

Referring to FIG. 5, in the third embodiment, after the cyclist has switched the microcomputer 21 to the automatic gear shifting mode, if, in the course of cycling, the microcomputer 21 determines to gear up in accordance with the automatic gear shifting logic, the microcomputer 21 will instruct the gear shifting driver 31 to drive the derailleur 91 to perform a gear-up gear shifting action. Upon completion of the gear-up gear shifting action, all other gear-down gear shifting commands during the third time period T3 (of 1.5 seconds) are ruled out, but gear-up gear shifting commands during the third time period T3 (of 1.5 seconds) are not ruled out. That is to say, during the third time period T3, even if the microcomputer 21 determines to gear down in accordance with the automatic gear shifting logic, the microcomputer 21 will rule out the determination and thus preclude gear shifting, but the microcomputer 21 will determine to perform gear shifting and instruct the gear shifting driver 31 to drive the derailleur 91 to take a gear-up gear shifting action if the microcomputer 21 determines to gear up. In doing so, the bicycle gear shift control system of the present invention precludes reciprocating gear shift movement which alternates between an upshift and a downshift.

Similarly, once the gear-down gear shifting action is finished, the microcomputer 21 will, during the fourth time period T4 (of 1.5 seconds), rule out all other gear-up gear shifting commands but not gear-down gear shifting commands and thus preclude reciprocating gear shift movement which alternates between an upshift and a downshift.

The remaining structures and advantages of the third embodiment are identical to their counterparts of the first embodiment and thus are not reiterated for the sake of brevity.

Figure 6:
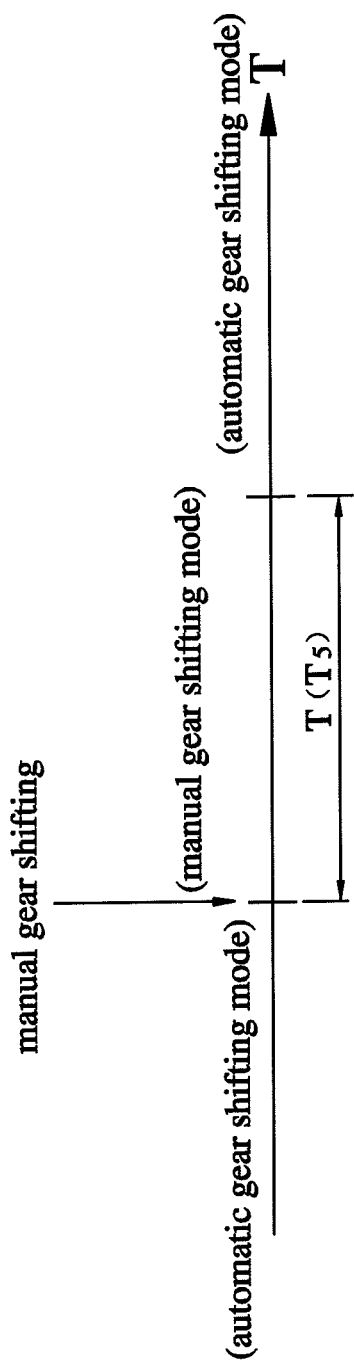
FIG. 6 is a schematic view of the relationship of a gear shifting action and time according to the fourth preferred embodiment of the present invention.

Referring to FIG. 6, a bicycle gear shift control system 70 capable of avoiding frequent gear shifting according to the fourth preferred embodiment of the present invention is different from the bicycle gear shift control system 10 in the first preferred embodiment of the present invention as described hereunder.

When the microcomputer 21 is operating in the automatic gear shifting mode, the cyclist can execute the instruction of manual gear shifting with the manual shifting controller 41. This feature distinguishes the fourth preferred embodiment from the first embodiment.

The gear shifting delay logic involves delaying for a fifth time period T5 from commencement of gear shifting when the cyclist executes an instruction of manual gear shifting with the manual shifting controller 41 in the automatic gear shifting mode, wherein, during the fifth time period T5, the microcomputer 21 rules out all other determinations of automatic gear shifting and merely accepts an instruction of manual gear shifting performed by the cyclist with the manual shifting controller 41, that is, entering the manual gear shifting mode, wherein the automatic gear shifting mode resumes as soon as the fifth time period T5 ends. In the fourth embodiment, the fifth time period T5 is exemplified by 30 seconds and depicted in FIG. 6.

In the fourth embodiment, in addition to the aforesaid situation where the automatic gear shifting mode resumes as soon as the fifth time period T5 ends, the point in time when the fifth time period T5 ends is set to be: a new time count will start, if the cyclist issues an instruction of manual gear shifting again. That is to say, during the fifth time period T5, if the microcomputer 21 receives an instruction of manual gear shifting performed by the cyclist with the manual shifting controller 41, the fifth time period T5 will be counted anew from the point in time of the receipt of the instruction.

Referring to FIG. 6, in the fourth embodiment, after the cyclist has switched the microcomputer 21 to the automatic gear shifting mode, if the cyclist executes an instruction of manual gear shifting with the manual shifting controller 41 while cycling, the microcomputer 21 will instruct the gear shifting driver 31 to drive the derailleur 91 to perform gear shifting. During the fifth time period T5 (of 30 seconds), the micro computer 21 rules out all other automatic gear shifting commands. That is to say, during the fifth time period T5, even if the microcomputer 21 determines to perform gear shifting in accordance with the automatic gear shifting logic, the microcomputer 21 will rule out the determination and preclude gear shifting and merely accept an instruction of manual gear shifting from the cyclist.

Hence, according to the fourth embodiment, in an automatic gear shifting mode, a cyclist can switch to a manual gear shifting mode for a period of time (i.e., the fifth time period T5) temporarily in order to perform manual gear shifting before switching back to the automatic gear shifting mode.

The remaining structures and advantages of the fourth embodiment are identical to their counterparts of the first embodiment and thus are not reiterated for the sake of brevity.

In the above embodiments, the duration (in second) of the first, second, third, fourth, and fifth time periods is illustrative rather than restrictive of the scope of the present invention and thus is subject to changes as needed, and depends on individual cyclists and manufacturers. In the above embodiments, the first, second, third, fourth, and fifth time periods are not only independent of each other, but can be combined when in use. For example, the cycling statuses in the second embodiment and the third embodiment can be combined such that, in the automatic gear shifting mode, other gear shifting commands are ruled out during the second time period T2 while gear shift control is underway, whereas, upon completion of gear shift control, it is still feasible to determine whether to rule out subsequent gear shifting commands according to the result of gear-up control or gear-down control during the third time period T3 or the fourth time period T4, thereby effectuating a combined use status. In an other example, the cycling statuses in the second embodiment and the fourth embodiment can be combined such that, in the automatic gear shifting mode, other gear shifting commands are ruled out during the second time period T2 while gear shift control is underway, whereas, if the cyclist executes an instruction of manual gear shifting (i.e., a manual gear shifting action has occurred) with the manual shifting controller 41 during the second time period, the microcomputer 21 will respond to a manual gear shifting command and thus switch to the manual gear shifting mode for a period of time (i.e., the fifth time period T5) temporarily before switching back to the automatic gear shifting mode, thereby effectuating another combined use status.

Accordingly, the present invention achieves benefits as follows:

1. avoiding frequent gear shifting and enhancing comfort of cycling while cycling is underway;

2. avoiding reciprocating gear shift movement which alternates between an upshift and a downshift and enhancing comfort of cycling while cycling is underway; and 3. carrying out manual gear shifting directly by the cyclist in the automatic gear shifting mode and switching to the manual gear shifting mode for a period of time temporarily before switching back to the automatic gear shifting mode.

What is claimed is:

1. A bicycle gear shift control system capable of avoiding frequent gear shifting, the system being installed on a bicycle having a derailleur, the system being adapted to control a gear shifting action of the derailleur, the system comprising:
 a power module;
 a microcomputer electrically connected to the power module and adapted to enable a cyclist to switch between an automatic gear shifting mode and a manual gear shifting mode;
 a gear shifting driver electrically connected to the microcomputer, substantially connected to the derailleur, and instructed by the microcomputer to drive the derailleur to perform gear shift control; and
 a manual shifting controller electrically connected to the microcomputer;
 wherein
 the microcomputer has an automatic gear shifting logic whereby the microcomputer determines a timing of automatic gear shifting and performs gear shifting;
 the microcomputer further has a gear shifting delay logic, wherein the gear shifting delay logic involves delaying for a delay time interval from commencement of gear shifting according to a gear shifting criterion, and ruling out all other gear shifting commands during the delay time interval;

if the cyclist switches to the automatic gear shifting mode, the microcomputer will rule out gear shifting commands issued by the cyclist with the manual shifting controller; and the gear shifting criterion is: in the automatic gear shifting mode, if the microcomputer instructs the gear shifting driver to drive the derailleur to perform gear-up gear shifting action, the microcomputer will rule out gear-down gear shifting commands and allow gear-up gear shifting commands, wherein the delay time interval is a set time period.

2. The system of claim 1, wherein the microcomputer will rule out gear-down gear shifting commands even if the microcomputer determines to gear down in accordance with automatic gear shifting logic during the delay time interval.

3. A bicycle gear shift control system capable of avoiding frequent gear shifting, the system being installed on a bicycle having a derailleur, the system being adapted to control a gear shifting action of the derailleur, the system comprising:

a power module;

a microcomputer electrically connected to the power module and adapted to enable a cyclist to switch between an automatic gear shifting mode and a manual gear shifting mode;

a gear shifting driver electrically connected to the microcomputer, substantially connected to the derailleur, and instructed by the microcomputer to drive the derailleur to perform gear shift control; and a manual shifting controller electrically connected to the microcomputer;

wherein the microcomputer has an automatic gear shifting logic whereby the microcomputer determines a timing of automatic gear shifting and performs gear shifting;

the microcomputer further has a gear shifting delay logic, wherein the gear shifting delay logic involves delaying for a delay time interval from commencement of gear shifting according to a gear shifting criterion, and ruling out all other gear shifting commands during the delay time interval;

if the cyclist switches to the automatic gear shifting mode, the microcomputer will rule out gear shifting commands issued by the cyclist with the manual shifting controller; and the gear shifting criterion is: in the automatic gear shifting mode, if the microcomputer instructs the gear shifting driver to drive the derailleur to perform gear-down gear shifting action, the microcomputer will rule out gear-up gear shifting commands and allow gear-down gear shifting commands, wherein the delay time interval is a set time period.

4. The system of claim 3, wherein the microcomputer will rule out gear-up gear shifting commands even if the microcomputer determines to gear up in accordance with automatic gear shifting logic during the delay time interval.

* * * * *